United States Patent
Tsuchiya et al.

(10) Patent No.: US 10,253,231 B2
(45) Date of Patent: Apr. 9, 2019

(54) AZEOTROPE TO AZEOTROPE-LIKE COMPOSITION CONTAINING 1-CHLORO-3,3,3-TRIFLUOROPROPENE AND 1,1,1,3,3-PENTAFLUOROPROPANE

(71) Applicant: DAIKIN INDUSTRIES, LTD., Osaka (JP)

(72) Inventors: Tatsumi Tsuchiya, Osaka (JP); Takashi Shibanuma, Osaka (JP); Yasufu Yamada, Osaka (JP); Hitomi Kuroki, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 15/129,906

(22) PCT Filed: Mar. 31, 2015

(86) PCT No.: PCT/JP2015/060240
§ 371 (c)(1),
(2) Date: Sep. 28, 2016

(87) PCT Pub. No.: WO2015/152286
PCT Pub. Date: Oct. 8, 2015

(65) Prior Publication Data
US 2017/0174965 A1    Jun. 22, 2017

(30) Foreign Application Priority Data
Mar. 31, 2014 (JP) .................................. 2014-073688

(51) Int. Cl.
| | |
|---|---|
| C09K 5/04 | (2006.01) |
| F25B 31/00 | (2006.01) |
| C10M 171/00 | (2006.01) |
| C10M 105/38 | (2006.01) |
| C10M 107/24 | (2006.01) |
| C10M 107/34 | (2006.01) |

(52) U.S. Cl.
CPC .............. *C09K 5/044* (2013.01); *C09K 5/045* (2013.01); *C10M 105/38* (2013.01); *C10M 107/24* (2013.01); *C10M 107/34* (2013.01); *C10M 171/008* (2013.01); *F25B 31/002* (2013.01); *C09K 2205/122* (2013.01); *C09K 2205/126* (2013.01); *C09K 2205/40* (2013.01); *C10M 2207/2835* (2013.01); *C10M 2209/043* (2013.01); *C10M 2209/1033* (2013.01); *C10N 2220/301* (2013.01); *C10N 2220/302* (2013.01); *F25B 2500/16* (2013.01)

(58) Field of Classification Search
CPC .. C09K 5/044; C09K 5/045; C09K 2205/126; C09K 2205/22; C09K 2205/40
See application file for complete search history.

(56) References Cited

U.S. PATENT DOCUMENTS

| | | | |
|---|---|---|---|
| 2005/0085674 A1 | 4/2005 | Nakada et al. | |
| 2010/0139274 A1* | 6/2010 | Zyhowski | C07C 21/18 60/651 |
| 2010/0326095 A1 | 12/2010 | Van Horn et al. | |
| 2012/0138847 A1 | 6/2012 | Van Horn et al. | |
| 2014/0260382 A1* | 9/2014 | Yana Motta | C09K 5/045 62/115 |

FOREIGN PATENT DOCUMENTS

| | | |
|---|---|---|
| JP | 2010-531926 | 9/2010 |
| JP | 2012/516336 | 7/2012 |
| WO | 00/29361 | 5/2000 |
| WO | 2009/114397 | 9/2009 |
| WO | 2010/077898 | 7/2010 |
| WO | 2010/088196 | 8/2010 |

OTHER PUBLICATIONS

International Search Report dated Jun. 9, 2015 in International (PCT) Application No. PCT/JP2015/060240.
Extended European Search Report dated Oct. 11, 2017 in European Application No. 15772888.2.

* cited by examiner

*Primary Examiner* — John R Hardee
(74) *Attorney, Agent, or Firm* — Wenderoth, Lind & Ponack, L.L.P.

(57) ABSTRACT

The problem to be solved by the present invention is to provide a novel mixed refrigerant that can be an alternative for HCFC-123, has a low ODP and a low GWP, has a COP equal to that of HCFC-123, and has a refrigerating capacity and gas density higher than those of single refrigerants, such as HCFO-1233zd(E) and HFC-245fa, which are being considered as alternative refrigerants for HCFC-123. A composition comprising a refrigerant, wherein the refrigerant comprises HCFO-1233zd(E) and HFC-245fa, and has a mass ratio of HCFO-1233zd(E) to HFC-245fa of 18:82 to 49:51 is provided as a means for solving the above problem.

9 Claims, No Drawings

AZEOTROPE TO AZEOTROPE-LIKE COMPOSITION CONTAINING 1-CHLORO-3,3,3-TRIFLUOROPROPENE AND 1,1,1,3,3-PENTAFLUOROPROPANE

TECHNICAL FIELD

The present invention relates to an azeotropic or azeotrope-like composition comprising trans-1-chloro-3,3,3-trifluoropropene (also referred to as "HCFO-1233zd(E)" in the present specification) and 1,1,1,3,3-pentafluoropropane (also referred to as "HFC-245fa" in the present specification).

BACKGROUND ART

Currently, 2,2-dichloro-1,1,1-trifluoroethane (also referred to as "HCFC-123" in the present specification) is used as a low-pressure refrigerant for large chiller refrigerators, particularly for turbo refrigerators.

However, HCFC-123 is a hydrochlorofluorocarbon (HCFC) containing chlorine in the molecule, and its use is being banned to protect the ozone layer.

Therefore, the replacement of HCFC-123 by new refrigerants using hydrofluorocarbons (HFCs), which do not contain chlorine in the molecule and have an ozone-depleting potential (ODP) of 0, is ongoing. However, HFC refrigerants are very stable and thus have a high global warming potential (GWP). In recent years, reduction of the use of HFC refrigerants, including the EU F-gas regulation, has been promoted to protect the global environment. Accordingly, HCFO (hydrochlorofluoroolefin) refrigerants are being developed as low-GWP refrigerants. The HCFO refrigerants contain HFO (hydrofluoroolefin) and chlorine, but have a short atmospheric life because they have a double bond. Further, these refrigerants have not only a very low GWP but also a very low ODP.

For example, PTL 1 proposes that HCFO-1233zd(E) can be used as an alternative refrigerant for HCFC-123, and refers to HFC-245fa as a refrigerant that may be optionally added; however, the mixing ratio thereof is not shown. Moreover, PTL 2 proposes an HCFC-123 alternative refrigerant comprising at least 50 wt. % of HCFO-1233zd(E) as a composition of a heat transfer medium.

CITATION LIST

Patent Literature

PTL 1: U.S. Patent Application Publication No. 2010/0326095
PTL 2: WO2010/077898

SUMMARY OF INVENTION

Technical Problem

An object of the present invention is to provide a mixed refrigerant that can be an alternative for HCFC-123, has a low ODP and a low GWP, has a COP equivalent to that of HCFC-123, and has a refrigerating capacity and gas density higher than those of single refrigerants, such as HCFO-1233zd(E) and HFC-245fa, which are being considered as alternative refrigerants for HCFC-123.

Solution to Problem

The present inventors conducted extensive research in view of the above object, and consequently found that a composition comprising an HCFO refrigerant and an HFC refrigerant mixed at a predetermined ratio had a higher refrigerating capacity and gas density than those of the HCFO refrigerant or the HFC refrigerant alone. The present inventors conducted further research based on this finding, and conceived of using HFC-245fa in combination with HCFO-1233zd(E), which has a relatively low GWP among HCFO refrigerants. Upon further trial and error, the present inventors found that the above object could be achieved by an azeotropic or azeotrope-like composition comprising HCFO-1233zd(E) and HFC-245fa at a specific ratio, and having a lower ODP and GWP, as well as a higher refrigerating capacity and gas density, than those of conventional HCFC-123.

The present invention has been completed upon further studies based on these findings. The present invention includes the following embodiments.

Item 1. A composition comprising a refrigerant,
wherein the refrigerant comprises HCFO-1233zd(E) and HFC-245fa, and has a mass ratio of HCFO-1233zd(E) to HFC-245fa of 18:82 to 49:51.

Item 2. A composition comprising a refrigerant,
wherein the refrigerant comprises HCFO-1233zd(E) and HFC-245fa, and has a mass ratio of HCFO-1233zd(E) to HFC-245fa of 29:71 to 38:62.

Item 3. A composition comprising a refrigerant,
wherein the refrigerant is an azeotropic or azeotrope-like composition comprising HCFO-1233zd(E) and HFC-245fa.

Item 4. The composition according to any one of items 1 to 3, further comprising a refrigerant oil.

Item 5. The composition according to item 4, wherein the refrigerant oil is at least one member selected from the group consisting of polyalkylene glycol (PAG), polyol ester (POE), and polyvinyl ether (PVE).

Item 6. The composition according to any one of items 1 to 5, which is used as a refrigerant for large chiller refrigerators.

Item 7. The composition according to any one of items 1 to 6, which is used as an alternative refrigerant for 2,2-dichloro-1,1,1-trifluoroethane (HCFC-123).

Item 8. Use of the composition according to any one of items 1 to 5 as a refrigerant for large chiller refrigerators.

Item 9. Use of the composition according to any one of items 1 to 5 as an alternative refrigerant for HCFC-123.

Item 10. A freezing method comprising the step of operating a refrigeration cycle using the composition according to any one of items 1 to 5.

Item 11. A method for operating a large chiller refrigerator, comprising the step according to item 10.

Item 12. A refrigerator comprising the composition according to any one of items 1 to 5.

Item 13. The refrigerator according to item 12, which is a large chiller refrigerator.

Item 14. A method for producing a composition comprising HCFO-1233zd(E) and HFC-245fa, the method comprising at least the step of mixing HCFO-1233zd(E) and HFC-245fa so that the mass ratio of HCFO-1233zd(E) to HFC-245fa is 18:82 to 49:51.

Advantageous Effects of Invention

The refrigerant composition of the present invention is suitable for refrigerants for large chiller refrigerators (turbo refrigerators, etc.). Because the refrigerant composition of the present invention is an azeotropic or azeotrope-like composition, there is no composition change between vapor and liquid phases, and it can be treated as a single substance.

Further, the refrigerant composition of the present invention has a high refrigerating capacity and gas density, which are indices of refrigerant performance.

DESCRIPTION OF EMBODIMENTS

1. Composition

The composition of the present invention comprises a refrigerant, wherein the refrigerant comprises HCFO-1233zd(E) and HFC-245fa, and has a mass ratio of HCFO-1233zd(E) to HFC-245fa (i.e., HCFO-1233zd(E):HFC-245fa) of 18:82 to 49:51.

Moreover, the composition of the present invention preferably has a mass ratio of HCFO-1233zd(E) to HFC-245fa of 29:71 to 38:62, in terms of refrigerating capacity and gas density. The composition according to this preferred embodiment is particularly suitable for use as a refrigerant for large chiller refrigerators, and for use as an alternative refrigerant for HCFC-123, as described later.

A binary refrigerant mixture consisting of HCFO-1233zd(E) and HFC-245fa becomes a minimum azeotropic composition in a temperature range of 0 to 100° C. and in a composition range of HCFO-1233zd(E)/HFC-245fa=20.5 to 38.9/61.1 to 79.5 mass %.

This minimum azeotropic composition exhibits the highest refrigerating capacity in the composition range of binary refrigerant mixtures consisting of HCFO-1233zd(E) and HFC-245fa, and this refrigerating capacity is higher than that of HFC-245fa alone.

A binary refrigerant mixture consisting of 18 to 49 mass % of HCFO-1233zd(E) and 51 to 82 mass % of HFC-245fa is like an azeotrope, and thus has a relatively higher refrigerating capacity and higher gas density among binary refrigerant mixtures consisting of HCFO-1233zd(E) and HFC-245fa. Specifically, the refrigerating capacity is at least 4% higher, and the gas density is at least 5% higher, than those of HFC-245fa alone.

A binary refrigerant mixture consisting of 29 to 38 mass % of HCFO-1233zd(E) and 62 to 71 mass % of HFC-245fa is like an azeotrope, and thus has a relatively higher refrigerating capacity and higher gas density among binary refrigerant mixtures consisting of HCFO-1233zd(E) and HFC-245fa. Specifically, the refrigerating capacity is at least 5% higher, and the gas density is at least 7% higher, than those of HFC-245fa alone.

The composition of the present invention comprises HCFO-1233zd(E) and HFC-245fa as refrigerants. The composition of the present invention may comprise a refrigerant other than HCFO-1233zd(E) and HFC-245fa, as long as the main effects of the present invention are not hindered. The refrigerants contained in the composition of the present invention comprise HCFO-1233zd(E) and HFC-245fa in the above specific proportions (that is, other refrigerants may be further contained), and may have, as functional characteristics, a higher refrigerating capacity and gas density than those of HFC-245fa alone. In another embodiment, the refrigerants contained in the composition of the present invention may have a COP equal to or higher than that of HCFC-123 alone, in addition to the above functional characteristics. It is more preferable that the refrigerants contained in the composition of the present invention comprise HCFO-1233zd(E) and HFC-245fa (that is, other refrigerants may be further contained); the mass ratio of HCFO-1233zd(E) to HFC-245fa is 18:82 to 49:51; the refrigerating capacity is at least 4% higher than that of HFC-245fa alone; and the gas density is at least 5% higher than that of HFC-245fa alone. It is still more preferable that the refrigerants contained in the composition of the present invention comprise HCFO-1233zd(E) and HFC-245fa (that is, other refrigerants may be further contained); the mass ratio of HCFO-1233zd(E) to HFC-245fa is 29:71 to 38:62; the refrigerating capacity is at least 5% higher than that of HFC-245fa alone; and the gas density is at least 7% higher than that of HFC-245fa alone.

Moreover, the composition of the present invention may further comprise other components, as long as the main effects of the present invention are not hindered.

Examples of the components (including refrigerants), other than HCFO-1233zd(E) and HFC-245fa, contained in the composition of the present invention include, but are not particularly limited to, $C_{4-5}$ hydrocarbon compounds, $C_3$ hydrogen-containing halogenated alkanes, alkenes, and alkynes, and the like. The composition of the present invention may comprise one or more other components.

The composition of the present invention may comprise oligomers of various refrigerant compounds. Examples of such oligomers include, but are not particularly limited to, dimers to tetramers and like oligomers of HCFO-1233zd(E). The composition of the present invention may comprise one or more oligomers of refrigerant compounds.

The above-described components other than HCFO-1233zd(E) and HFC-245fa may be contained as impurities, or may be positively added in order to improve refrigerant characteristics. Moreover, these other components may be converted from the refrigerants during the operation of the refrigerator.

$C_{4-5}$ hydrocarbon compounds, which are components other than HCFO-1233zd(E) and HFC-245fa, may be saturated or unsaturated, and may be branched or linear. Examples thereof include, but are not particularly limited to, n-butane, 1-butene, 2-butene, n-pentane, isopentane, neopentane, 2-methyl-1-butene, 3-methyl-1-butene, and the like.

Examples of $C_3$ hydrogen-containing halogenated alkanes, which are components other than HCFO-1233zd(E) and HFC-245fa, include, but are not particularly limited to, HFC-245eb, HFC-236cb, HFC-236ea, HFC-236fa, and the like.

Examples of hydrogen-containing halogenated alkenes, which are components other than HCFO-1233zd(E) and HFC-245fa, include, but are not particularly limited to, 1,2,3,3-pentafluoropropene (E and Z isomers), 2,3,3,3-tetrafluoropropene, 1,3,3,3-tetrafluoropropene (E and Z isomers), 2-bromo-1,3,3,3-tetrafluoropropene (E and Z isomers), 1-bromo-2,3,3,3-tetrafluoropropene (E and Z isomers), 2-bromo-3,3,3-trifluoropropene, 1-bromo-1,1,3,3-tetrafluoropropene, 1-bromo-3,3,3-trifluoropropene (E and Z isomers), 3-bromo-1,3,3-trifluoropropene (E and Z isomers), 3-bromo-3,3-difluoropropene, 2-chloro-1,3,3,3-tetrafluoropropene (E and Z isomers), 1-chloro-2,3,3,3-tetrafluoropropene (E and Z isomers), 2-chloro-3,3,3-trifluoropropene, 3-chloro-1,1,3,3-tetrafluoropropene, 1-chloro-3,3,3-trifluoropropene (E and Z isomers), 3-chloro-1,3,3-trifluoropropene (E and Z isomers), 3-chloro-3,3-difluoropropene, and the like.

Examples of $C_3$ hydrogen-containing halogenated alkynes, which are components other than HCFO-1233zd(E) and HFC-245fa, include, but are not particularly limited to, 3,3,3-trifluoropropyne, and the like.

The type of component other than HCFO-1233zd(E) and HFC-245fa, and the ratio of the component in all of the refrigerants, can be suitably selected and determined in a range in which the main effects of the present invention are not hindered. The ratio of the other component depends on the type thereof, and is not particularly limited. For example, when the composition of the present invention comprises one or more other refrigerants, the ratio of the total amount of the one or more other refrigerants in all the refrigerants is preferably 0 mass % to 10 mass %, and more preferably 0 mass % to 5 mass %.

In the composition of the present invention, the refrigerant may be one essentially consisting of HCFO-1233zd(E) and HFC-245fa (i.e., a substantial binary refrigerant mixture), or one consisting of HCFO-1233zd(E) and HFC-245fa (i.e., a binary refrigerant mixture). However, the refrigerant consisting of HCFO-1233zd(E) and HFC-245fa according to the present invention also includes refrigerants that contain, in addition to HCFO-1233zd(E) and HFC-245fa, only impurities and other components in an amount that is less than the detection limit of a detection means generally used in this technical field.

The composition of the present invention may further comprise a refrigerant oil, but the refrigerant oil is not particularly essential. In this case, the composition of the present invention comprises at least a refrigerant oil, in addition to the refrigerants. The composition of the present invention may comprise one or more refrigerant oils.

The refrigerant oil in the composition of the present invention can be suitably selected from generally used refrigerant oils, although it is not particularly limited thereto. In that case, a refrigerant oil that is superior in terms of the effect of improving miscibility with refrigerants, the stability of refrigerants, etc., may be suitably selected, as required. Although it is not particularly limited, the stability of refrigerants can be evaluated by a generally used method, such as an evaluation method using the amount of free fluorine ions as an index according to ASHRAE standard 97-2007. There is another evaluation method using total acid number as an index. This method can be performed according to ASTM D 974-06, for example.

As the refrigerant oil, the composition of the present invention may comprise, for example, but is not particularly limited to, at least one member selected from the group consisting of polyalkylene glycol (also referred to as "PAG" in the present specification), polyol ester (also referred to as "POE" in the present specification), and polyvinyl ether (also referred to as "PVE" in the present specification).

Usable refrigerant oils are not particularly limited, and include those having a kinematic viscosity at 40° C. of 5 to 400 cSt. A kinematic viscosity within this range is preferable in terms of lubricity.

In the above case, the ratio of the refrigerant oil in the entire composition is generally 10 wt. % to 50 wt. %, but is not particularly limited thereto.

Although it is not particularly essential, the composition of the present invention may contain a stabilizer, as required, for example, when high stability is required under severe service conditions. The composition of the present invention may contain one or more stabilizers.

Examples of such stabilizers include:

(i) aliphatic nitro compounds, such as nitromethane and nitroethane; and aromatic nitro compounds, such as nitrobenzene and nitrostyrene; and (ii) ethers, such as 1,4-dioxane; amines, such as 2,2,3,3,3-pentafluoropropylamine and diphenylamine; butylhydroxyxylene, benzotriazole, and the like.

The content of the stabilizer varies depending on the type of stabilizer, but can be suitably determined within a range in which the main effects of the present invention are not hindered. The content of the stabilizer is generally preferably about 0.01 to 5 parts by weight, and more preferably about 0.05 to 2 parts by weight, based on the total amount (100 parts by weight) of the refrigerants.

The composition of the present invention may further contain a polymerization inhibitor, as required. The composition of the present invention may contain one or more polymerization inhibitors. Examples of polymerization inhibitors include, but are not particularly limited to, 4-methoxy-1-naphthol, hydroquinone, hydroquinone methyl ether, dimethyl-t-butylphenol, 2,6-di-tert-butyl-p-cresol, benzotriazole, and the like.

The content of the polymerization inhibitor is generally preferably about 0.01 to 5 parts by weight, and more preferably about 0.05 to 2 parts by weight, based on the total amount (100 parts by weight) of the refrigerants.

The composition of the present invention may further contain a desiccant, as required. The composition of the present invention may contain one or more desiccants.

The composition of the present invention may further contain other components, as required. The composition of the present invention may contain one or more other components.

2. Application and Use of Composition

The composition of the present invention can be used in various refrigerators. The term "refrigerator" in the present specification refers to, in a broad sense, a device that removes heat from an object or a space to thereby reduce the temperature of the object or space below the temperature of the surrounding outside air, and maintains the low temperature. In other words, the term "refrigerator" refers to, in a broad sense, a converter that operates by receiving energy from the outside to convert the energy in order to transfer heat from a lower temperature to a higher temperature. In the present invention, the term "refrigerator" is synonymous with "heat pump" in a broad sense.

Moreover, in the present invention, in a narrow sense, refrigerators are differentiated from heat pumps based on the difference in the temperature region used and the operating temperature. In this case, refrigerators may refer to devices in which a low-temperature heat source is placed in a temperature region lower than the atmospheric temperature, whereas heat pumps may refer to devices that use heat radiation action obtained by driving a refrigeration cycle by a low-temperature heat source placed in a temperature region close to the atmospheric temperature.

Some devices have both the function of refrigerators in a narrow sense and the function of heat pumps in a narrow sense in one device, as with air conditioners and the like that have a "cooling mode," a "heating mode," etc. In the present specification, both of the terms "refrigerator" and "heat pump" are used in a broad sense, unless otherwise specified.

In the present invention, examples of refrigerators include, but are not particularly limited to, drinking water coolers, large chiller refrigerators (turbo refrigerators, chillers (chilling units), screw chillers, etc.), freezing and refrigerating units, refrigerating showcases, freezing showcases, packaged air conditioners, and the like.

In the present invention, the term "chiller (or chiller refrigerator)" refers to a system that comprises a refrigerator containing a refrigerant, and a circuit for circulating water or antifreeze liquid, and that performs heat exchange with a cooler. The term "large chiller refrigerator" refers to a large air-conditioning apparatus that is a type of chiller and is intended for air conditioning in a unit of a building.

Further, in the present invention, the term "turbo refrigerator" refers to a refrigerator that is a type of large chiller refrigerator, and that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

Examples of refrigerators include, but are not particularly limited to, a wide range of vapor-compression refrigerators, vapor-jet refrigerators, air-cycle refrigerators, and the like. Typical examples include vapor-compression refrigerators.

Refrigerators that can use the composition of the present invention are preferably employed for professional uses (including, for example, industrial, experimental, and transportation applications).

Low-pressure refrigerants are preferably used to air condition a relatively wide space with a large amount of refrigerant placed in a large (chiller) refrigerator.

The composition of the present invention is particularly suitable for use as a low-pressure refrigerant for large chiller refrigerators.

The composition of the present invention can be used as an alternative refrigerant for HCFC-123.

Specifically, the composition of the present invention can be used in place of HCFC-123 in a freezing method comprising the step of operating a refrigeration cycle using HCFC-123.

Because the characteristics of the composition of the present invention are similar to those of HCFC-123, the composition of the present invention can be used as a drop-in alternative refrigerant or nearly drop-in alternative refrigerant for HCFC-123 in a refrigeration air conditioner using HCFC-123.

3. Freezing Method

The freezing method of the present invention comprises the step of operating a refrigeration cycle using the composition of the present invention.

Examples of refrigeration cycles mainly include vapor-compression refrigeration cycles, vapor-jet refrigeration cycles, vapor-absorption refrigeration cycles, and the like. The composition of the present invention is suitable for use in vapor-compression refrigeration cycles, but is not particularly limited thereto.

A vapor-compression refrigeration cycle comprises a series of cycles of (1) compressing a refrigerant in a gaseous state in a compressor, (2) cooling the refrigerant to convert it into a high-pressure liquid state in a condenser, (3) reducing the pressure by an expansion valve, and (4) evaporating the liquid refrigerant at a low temperature in an evaporator and removing heat by the heat of evaporation. Depending on the system of compressing gaseous refrigerants, vapor-compression refrigeration cycles can be classified into a turbo (centrifugal) cycle, a reciprocating cycle, a twin-screw cycle, a single-screw cycle, a scroll compressor cycle, etc., and can be selected according to heat capacity, compression ratio, and size. The composition of the present invention is suitable as a refrigerant used for large chiller refrigerators, and particularly turbo (centrifugal) compressors, although it is not particularly limited thereto.

EXAMPLES

The present invention is described below with reference to Examples; however, the present invention is not limited thereto.

The compositions of the present invention (Examples 1 to 4) shown in Table 1 were used as a working fluid in a cooling system (single-stage vapor-compression refrigeration cycle). Further, the compositions of Comparative Examples 1 to 6 shown in Table 1 were similarly used in the same cooling system.

The operating conditions of the system were as follows: condenser temperature: 5° C., evaporator temperature: 45° C., degree of superheat: 2 K, and degree of supercooling: 8 K.

The COP, refrigerating capacity (kJ/m$^3$), and gas density were measured in each of the Examples and Comparative Examples. Table 2 shows values relative to the value (100) of HFC-245fa alone, which has the highest refrigerating capacity among HCFC-123, HCFO-1233zd(E), and HFC-245fa.

TABLE 1

|  | HCFO-1233zd (E) | HFC-245fa | HCFC-123 | (Mass %) HFC-365mfc |
|---|---|---|---|---|
| Example 1 | 18 | 82 | 0 | 0 |
| Example 2 | 29 | 71 | 0 | 0 |
| Example 3 | 38 | 62 | 0 | 0 |
| Example 4 | 49 | 51 | 0 | 0 |
| Comparative Example 1 | 0 | 100 | 0 | 0 |
| Comparative Example 2 | 60 | 40 | 0 | 0 |
| Comparative Example 3 | 100 | 0 | 0 | 0 |
| Comparative Example 4 | 0 | 0 | 100 | 0 |
| Comparative Example 5 | 99.9 | 0 | 0 | 0.1 |
| Comparative Example 6 | 89 | 0 | 0 | 11 |

TABLE 2

|  | COP | Refrigerating capacity | Gas density |
|---|---|---|---|
| Example 1 | 100 | 104 | 105 |
| Example 2 | 100 | 105 | 107 |
| Example 3 | 100 | 105 | 107 |
| Example 4 | 100 | 104 | 106 |
| Comparative Example 1 | 100 | 100 | 100 |
| Comparative Example 2 | 100 | 102 | 103 |
| Comparative Example 3 | 100 | 88 | 86 |
| Comparative Example 4 | 101 | 69 | 69 |
| Comparative Example 5 | 101 | 88 | 87 |
| Comparative Example 6 | 101 | 82 | 81 |

The results demonstrate that the mixtures of HCFO123zd (E) and HFC-245fa in the composition ranges shown in Examples 1 to 4, that is, HCFO-1233zd(E)/HFC-245fa=18 to 49/51 to 82 mass %, had a COP equivalent to that of HCFC-123 used as a single refrigerant, and had a superior refrigerating capacity and gas density to those of HCFC-123, HCFO-1233zd(E), or HFC-245fa, each of which was used as a single refrigerant.

Furthermore, the results of the Examples were superior to Comparative Example 2 (HCFO-1233zd(E)/HFC-245fa=60/40 mass %) in refrigerating capacity and gas density. It was revealed that, among the compositions comprising HCFO-1233zd(E) and HFC-245fa, the refrigerants having the compositions shown in the Examples were particularly excellent.

The invention claimed is:

1. A composition consisting of a refrigerant and a refrigerant oil,
    wherein the refrigerant consists of HCFO-1233zd(E) and HFC-245fa, and has a mass ratio of HCFO-1233zd(E) to HFC-245fa of 18:82 to 49:51.

2. A composition consisting of a refrigerant and a refrigerant oil,
    wherein the refrigerant consists of HCFO-1233zd(E) and HFC-245fa, and has a mass ratio of HCFO-1233zd(E) to HFC-245fa of 29:71 to 38:62.

3. A composition consisting of a refrigerant and a refrigerant oil,
    wherein the refrigerant is an azeotropic or azeotrope-like composition consisting of HCFO-1233zd(E) and HFC-245fa.

4. The composition according to claim 1, wherein the refrigerant oil is at least one member selected from the group consisting of polyalkylene glycol (PAG), polyol ester (POE), and polyvinyl ether (PVE).

5. A freezing method comprising the step of operating a refrigeration cycle using the composition according to claim 1.

6. A method for operating a large chiller refrigerator, comprising the step according to claim 5.

7. A freezing method comprising the step of operating a refrigeration cycle using the composition according to claim 1, wherein the refrigerant is used as an alternative refrigerant for 2,2-dichloro-1,1,1-trifluoroethane (HCFC-123).

8. A refrigerator comprising the composition according to claim 1.

9. The refrigerator according to claim 8, which is a large chiller refrigerator.

* * * * *